United States Patent
Alcorn

[19]

[11] Patent Number: 6,036,067
[45] Date of Patent: Mar. 14, 2000

[54] CARRIER FOR FISH LANDING NET

[76] Inventor: A. Shane Alcorn, 95641 Eggers Rd., Brookings, Oreg. 97415

[21] Appl. No.: 09/217,407

[22] Filed: Dec. 21, 1998

[51] Int. Cl.$^7$ ........................................................ A45F 4/02
[52] U.S. Cl. ...................... 224/153; 43/54.1; 206/315.11; 224/223; 224/579; 224/584; 224/645; 224/922
[58] Field of Search .................... 224/579, 153, 224/584, 627, 656, 657, 658, 259, 645, 652, 249, FOR 209, 223; 43/5, 54.1; 150/163; 206/315.1, 315.11

[56] References Cited

U.S. PATENT DOCUMENTS

| | | | |
|---|---|---|---|
| 1,617,600 | 2/1927 | Kirsch | 224/223 |
| 1,633,319 | 6/1927 | Estwing | 224/234 |
| 1,636,194 | 7/1927 | Mullins | 224/597 |
| 3,854,639 | 12/1974 | Genchi | 224/234 |
| 4,000,678 | 1/1977 | Messina | 84/453 |
| 4,090,543 | 5/1978 | Chyten | 150/163 |
| 4,571,875 | 2/1986 | Ballas . | |
| 4,671,009 | 6/1987 | Faunce . | |
| 4,722,667 | 2/1988 | Rikhy . | |
| 4,729,474 | 3/1988 | Lanius . | |
| 4,768,651 | 9/1988 | Lanius . | |
| 4,805,748 | 2/1989 | Gerch | 190/103 |
| 4,980,988 | 1/1991 | Whitman . | |
| 5,209,009 | 5/1993 | Fast . | |
| 5,331,761 | 7/1994 | Kuthy . | |
| 5,509,227 | 4/1996 | Marrero . | |
| 5,560,145 | 10/1996 | Anderson . | |
| 5,651,141 | 7/1997 | Schneider . | |
| 5,655,695 | 8/1997 | Anderson et al. | 224/431 |
| 5,704,158 | 1/1998 | Whiteaker . | |

*Primary Examiner*—Gregory M. Vidovich
*Assistant Examiner*—Maerena W. Brevard
*Attorney, Agent, or Firm*—Prince, Yeates & Geldzahler

[57] ABSTRACT

A carrier (10) for a fish landing net (20) comprises two essentially flat and parallel sides (12, 14) that are attached together along the majority of their adjacent edges (16, 18) in a manner to form a pocket for receiving therein the fish landing net. A handle opening (30) at the bottom of the carrier permits the handle (26) to extend from the body of the carrier. The carrier includes an open/closure mechanism across the top or a part of the top and one side for permitting easy opening and withdrawal of the fish landing net from the carrier and easy insertion of the fish landing net into the carrier and closing. The fish landing net carrier also includes a plurality of individual pockets (36) of various shapes and sizes for carrying a variety of fishing accessories. In addition, the fish landing net carrier includes a strap mechanism (40) for strapping one or more fishing poles, rods, or pole caddies onto the back of the carrier for ease of transportation. The fish landing net carrier may include a number of straps, handles, and hooks for enabling the fisherman to easily transport the fish landing net within the carrier, a number of fishing accessories, and a number of fishing poles, rods, or pole caddies contemporaneously either by hand, over-the-shoulder, or attached to a backpack.

14 Claims, 8 Drawing Sheets

CARRIER FOR FISH LANDING NET

BACKGROUND OF THE INVENTION

1. Field of the Invention

The present invention relates to carriers or holsters for fish landing nets, and more particularly relates to such a device having means for attaching and carrying a fishing pole, reel, and other accessories used in the sport of fishing.

2. Description of the Prior Art

Generally, the sport of fishing requires a number of necessary additional accessories in addition to the obvious fishing pole and bait. Among other things, a fish landing net is most helpful in retrieving hooked fish from the water. Heretofore, when traveling and/or transporting a fish landing net, it is commonly simply carried along with the other necessary fishing accessories, customary fish landing nets being too large to fit into typical tackle boxes. Therefore, there continuously arises the problem of the mesh net portion of the fish landing net hanging on literally everything it touches during transportation from its home storage place to the fishing site, and back. Specifically, the mesh portion of the net is caught by and hangs on knobs and handles, clothing, twigs, branches, oar locks, etc., not to mention the accompanying accessories the fisherman carries with him, as in fishing pole or rod and reel, hooks, tackle box and tackle, pole stands, food and drink, etc. Understandably, before the instant invention, fishermen simply dealt with this problem by repeatedly unhooking the mesh portion of the net and proceeding until the net caught on something else.

OBJECTS OF THE INVENTION

It is therefore an object of the present invention to provide a carrier or holster for a fish landing net that contains the mesh portion of the net during transport to and from the fishing site in order to eliminate the possibility of the mesh portion of the net hanging or catching on fishing accessories or other objects.

It is a further object of the present invention to provide such a carrier or holster for a fish landing net that includes a plurality of pockets and attachment devices for carrying various fishing accessories, including the fishing pole/rod and reel.

It is a still further object of the present invention to provide such a carrier/holster for a fish landing net that is readily and easily carried by the fisherman in a way so as to not interfere with his carrying of additional fishing equipment and accessories.

It is a still further object of the present invention to provide such a carrier/holster for a fish landing net that is readily and easily hooked onto a conventional backpack, and carried/worn by the fisherman in a way so as to not interfere with his carrying of additional fishing equipment and accessories.

SUMMARY OF THE INVENTION

A carrier (10) for a fish landing net (20) comprises two essentially flat and parallel sides (12, 14) that are attached together along the majority of their adjacent edges (16, 18) in a manner to form a pocket for receiving therein the fish landing net. A preferred embodiment of the landing net carrier includes a handle opening (30) at the bottom thereof for permitting the handle (26) to extend from the body of the carrier. The carrier includes an open/closure mechanism across the top or a part of the top and one side for permitting easy opening and withdrawal of the fish landing net from the carrier and easy insertion of the fish landing net into the carrier. The fish landing net carrier also includes a plurality of individual pockets (36) of various shapes and sizes for carrying a variety of fishing accessories. In addition, the fish landing net carrier includes a strap mechanism (40) for strapping one or more fishing poles, rods, or pole caddies onto the back of the carrier for ease of transportation. The fish landing net carrier may include a number of straps, handles, and hooks for enabling the fisherman to easily transport the fish landing net within the carrier, a number of fishing accessories, and a number of fishing poles, rods, or pole caddies contemporaneously either by hand, over-the-shoulder, or attached to a backpack.

DETAILED DESCRIPTION OF THE INVENTION

Figure 1:
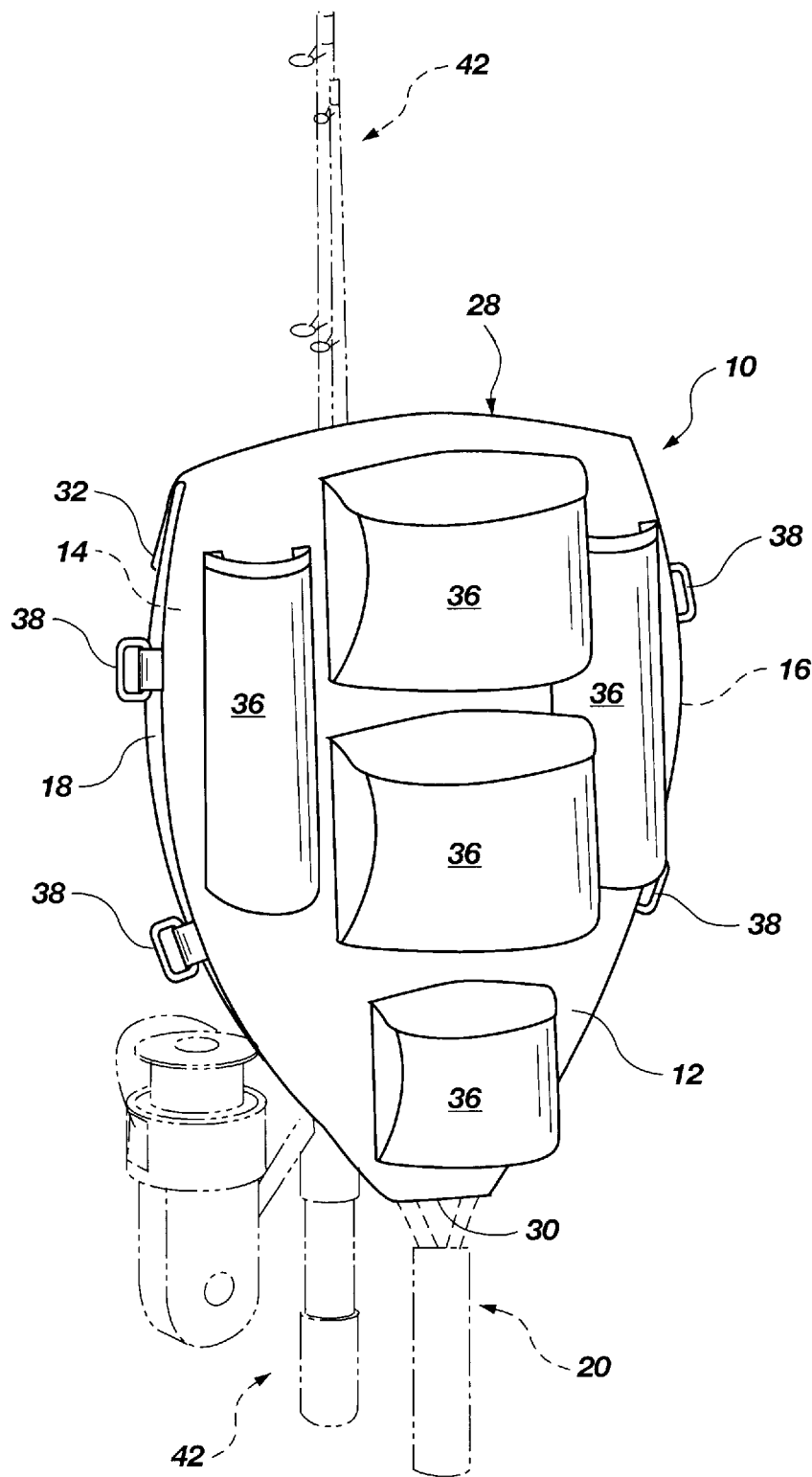
FIG. 1 is a perspective view of the fish landing net carrier of the present invention.
Figure 2:
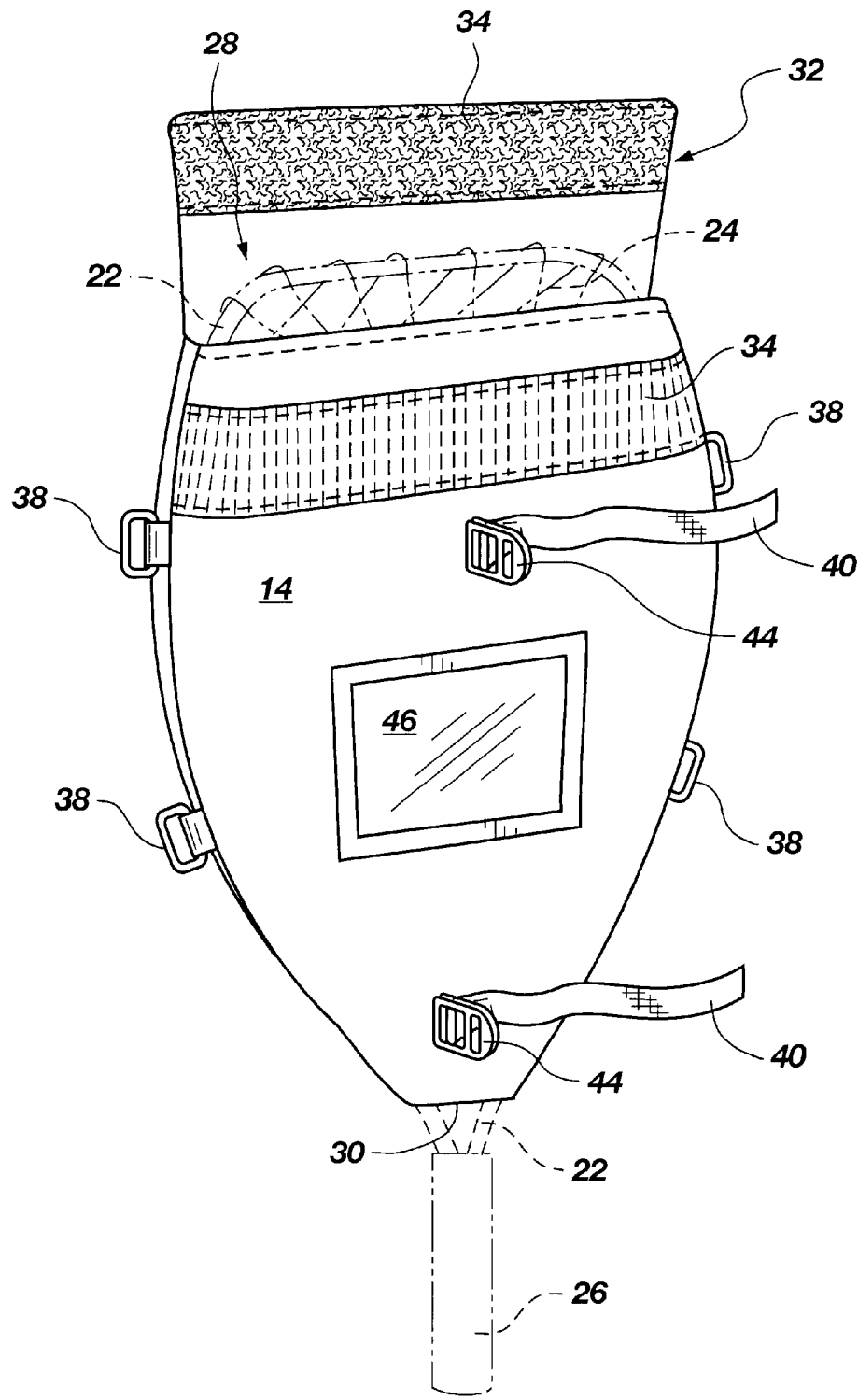
FIG. 2 is a perspective view of the opposite side of the fish landing net carrier.

Turning now to the drawings and initially to FIG. 1, the fish landing net carrier of the present invention is shown generally illustrated by the numeral 10. In the preferred embodiment of the invention, the carrier 10 comprises two essentially flat and parallel sides, indicated at 12 for the front side and 14 for the back side. These sides are essentially identical in size and shape, with adjoining edges 16 and 18 permanently connected together at at least a portion thereof in order to define an openable pocket for receiving therein a fish landing net 20. As best shown in FIG. 2, the fish landing net 20 generally comprises a rim 22, a mesh net portion 24, and a handle 26.

The preferred embodiment of the fish landing net carrier 10 of the present invention is shown having the adjoining edges 16 and 18 permanently connected together along essentially their entire right and left sides, leaving a top opening 28 for inserting the entire fish landing net into the carrier, and a bottom handle opening 30 for permitting the fish landing net handle to extend therethrough. FIG. 2 also illustrates a closure flap 32 formed with the carrier front side 12 that is adapted to fold over and attach to the carrier back side 14 in a customary manner. In this preferred embodiment, closure flap 32 removably attaches to the back side 14 with a conventional loop end fastener mechanism 34 (commonly called a Velcro® fastener). FIG. 1 also illustrates the plurality of individual pockets 36 formed on the carrier back side 14 for transporting any number of fishing accessories along with the fish landing net carrier. As shown, these pockets 36 are of various sizes and shapes in order to accommodate a variety of fishing accessories. The carrier 10 also includes a number of rings 38 formed in the adjoining edges 16, 18 of the carrier, also for permitting attachment of fishing accessories by means of a hook or clasp.

FIG. 2 illustrates the means for attaching a fishing pole or rod and reel to the carrier 10 of the present invention. This fishing pole attachment means comprises two or more straps 40 designed to loop around the fishing pole/rod 42, or a pole caddy (not shown), and secure the pole/rod and/or caddy to the carrier by a strap buckle 44 or by hook and loop fasteners. FIG. 2 also illustrates the inclusion of a clear window pocket 46 formed with the back side 14 for carrying fishermen identification and/or fishing license in readily viewable fashion.

Figure 3:
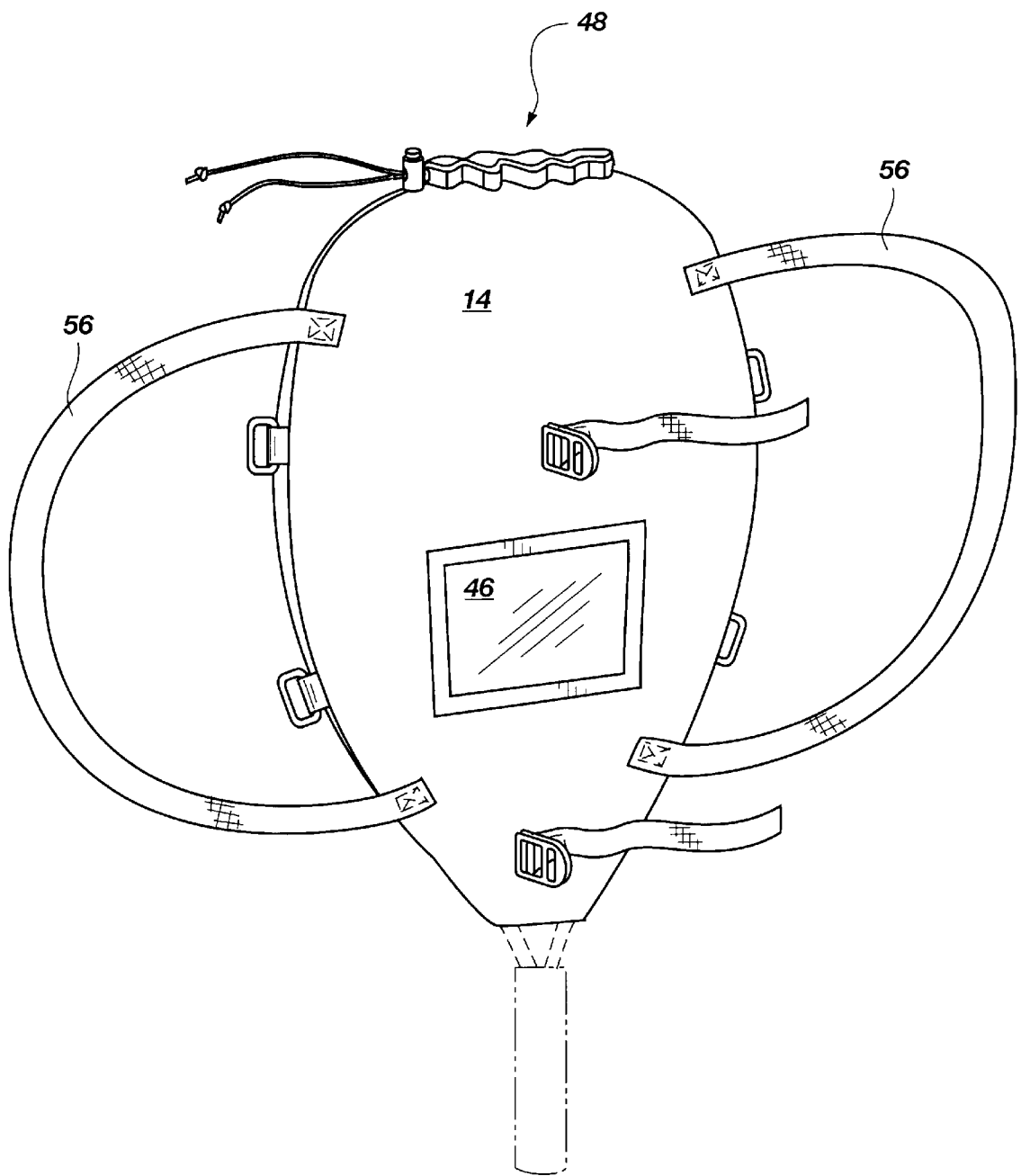
FIG. 3 is a perspective view of the fish landing net carrier illustrating the pull-string closure mechanism.
Figure 4:
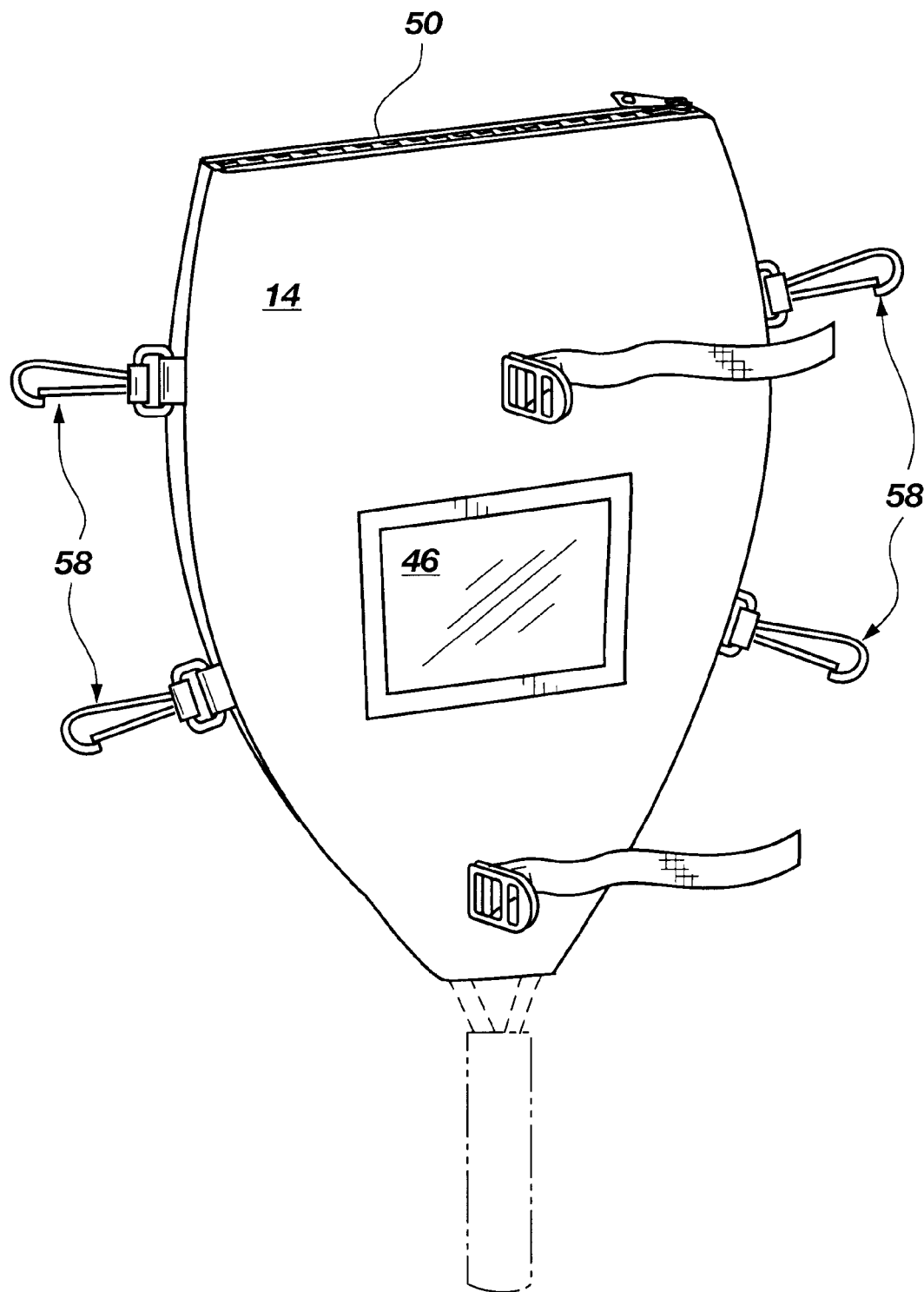
FIG. 4 is a perspective view of the fish landing net carrier illustrating the zipper top closure mechanism.
Figure 5:
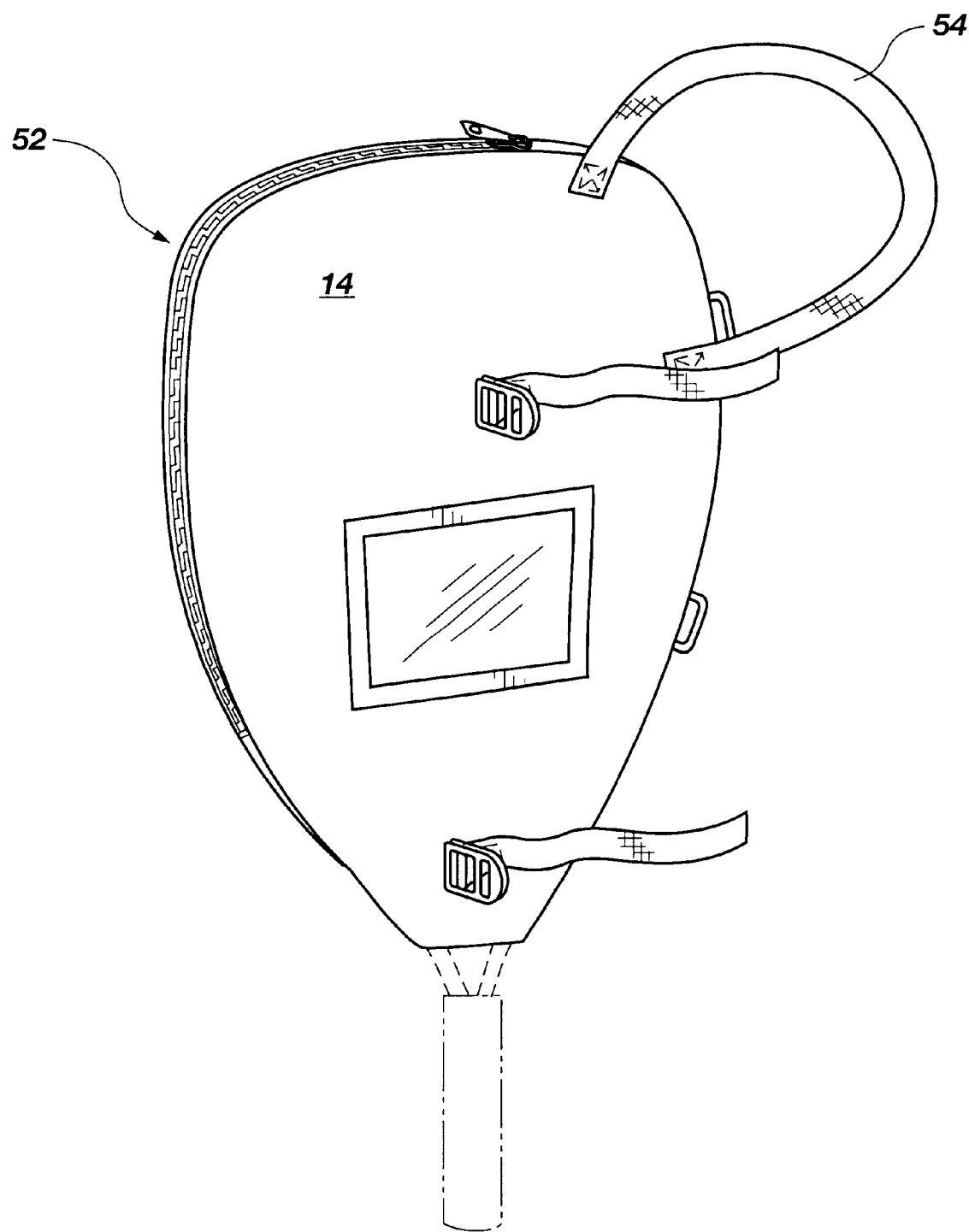
FIG. 5 is a perspective view of the fish landing net carrier illustrating the zipper side closure mechanism.
Figure 7:
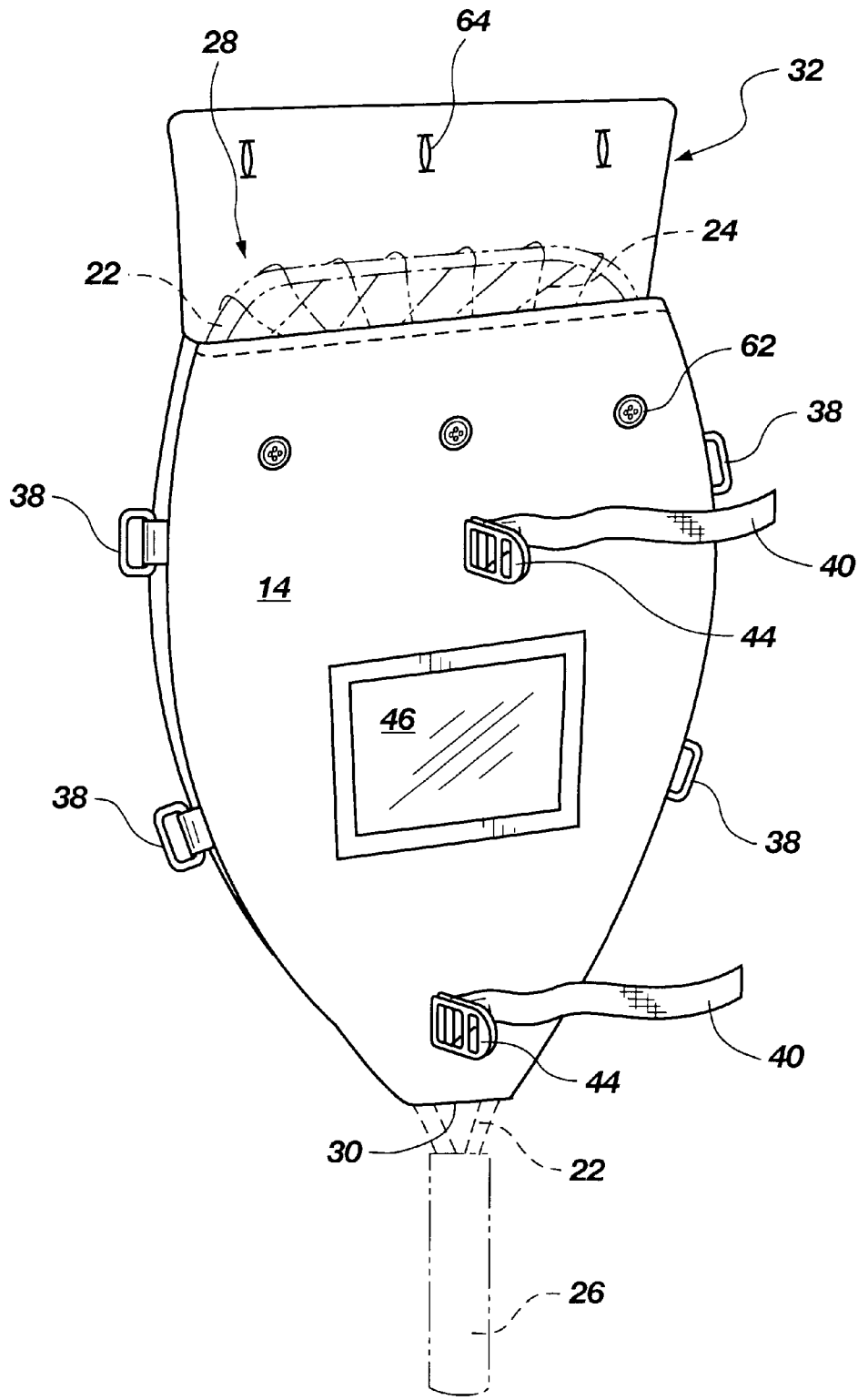
FIG. 7 is a perspective view of the fish landing net carrier illustrating the button top closure mechanism.
Figure 8:
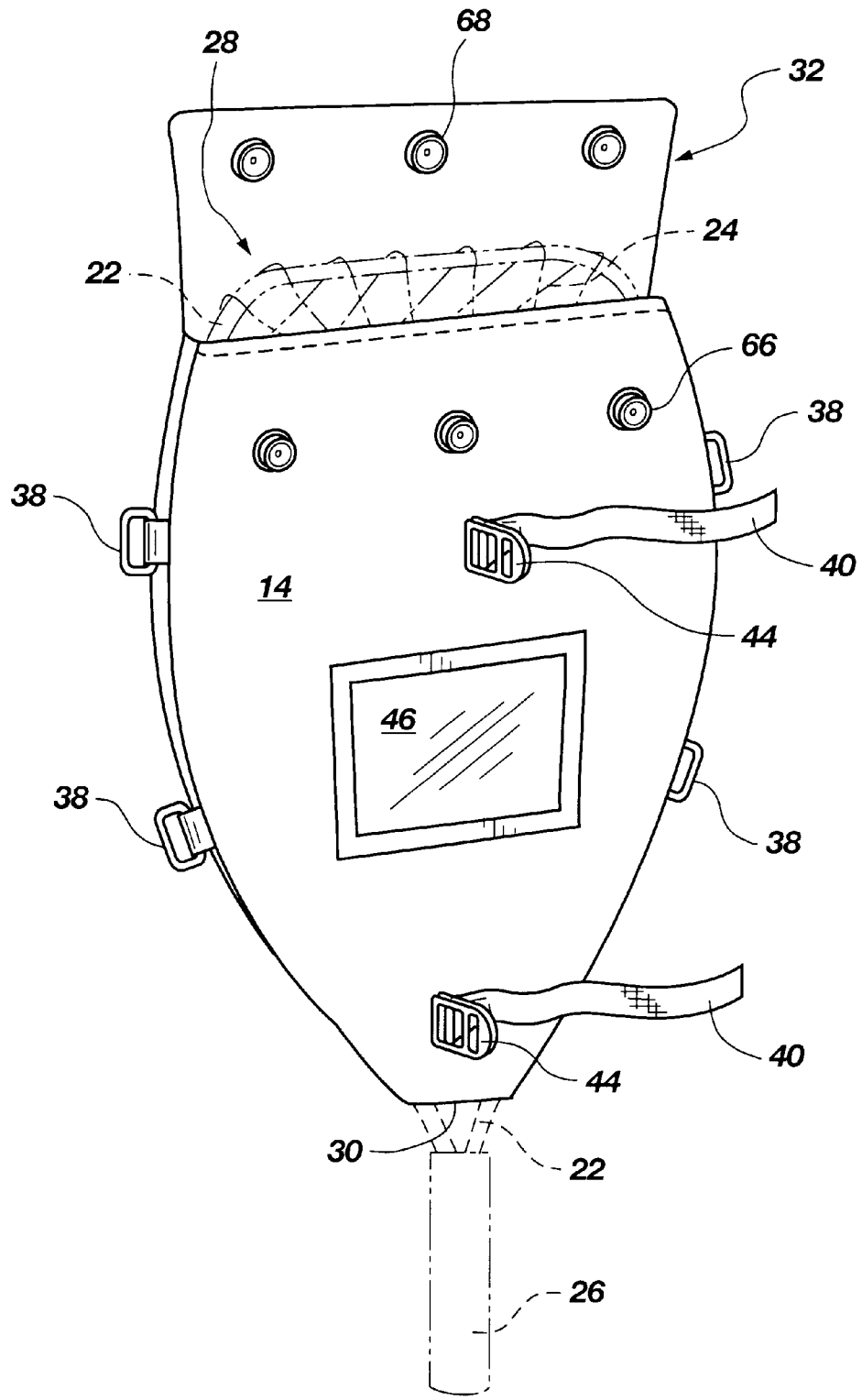
FIG. 8 is a perspective view of the fish landing net carrier illustrating the snap top closure mechanism.

The preferred embodiment of the fish landing net carrier 10 of the present invention shown in FIGS. 1 and 2 illustrates a closing flap and hook and loop fastener mechanism 34 on the flap for closing the carrier and containing the fish landing net therein. FIGS. 3, 4, 5, 7, and 8 illustrate alternative embodiments of the fish landing net carrier having various types of closure means for the top of the carrier. Specifically, FIG. 3 illustrates a pull-string closure mechanism 48 for the top opening, wherein a pull-string within a string channel adjacent the top opening is simply pulled and tied or pulled and secured with a conventional string securing mechanism in a customary fashion. FIG. 4 illustrates a zipper closure mechanism 50 across the top of the carrier. FIG. 5 illustrates a zipper closure mechanism 52 across part of the top and down part of one of the side adjoining edges 16 or 18 of the carrier. FIG. 7 illustrates a closure flap 32 having a button closure mechanism 62 with mating button holes 64 in the closure flap, and FIG. 8 illustrates a closure flap having a snap closure mechanism 66 with mating snaps 68 in the closure flap.

FIG. 5 also illustrates a handle 54 sewn into both the front and back sides 12,14 of the fish landing net carrier for convenient transporting of the carrier and its contained fishing pole/reel and accessories. FIG. 3 illustrates a shoulder strap 56 for permitting the fish landing net to be carried on one's back like a backpack. FIG. 4 illustrates the inclusion of a plurality of hooks 58 that serve at least two purposes. The hooks 58 can be used to attach the fish landing net to a conventional backpack, and also are useable for attaching loose accessories to the fish landing net. In addition, these various handle straps and hooks can be used for removably attaching the fish landing net carrier to a seat or chair, the interior of a boat or canoe, a post, or any other readily accessible structure in order to provide easy access to the fish landing net when it is needed quickly to land a hooked fish from the water.

Figure 6:
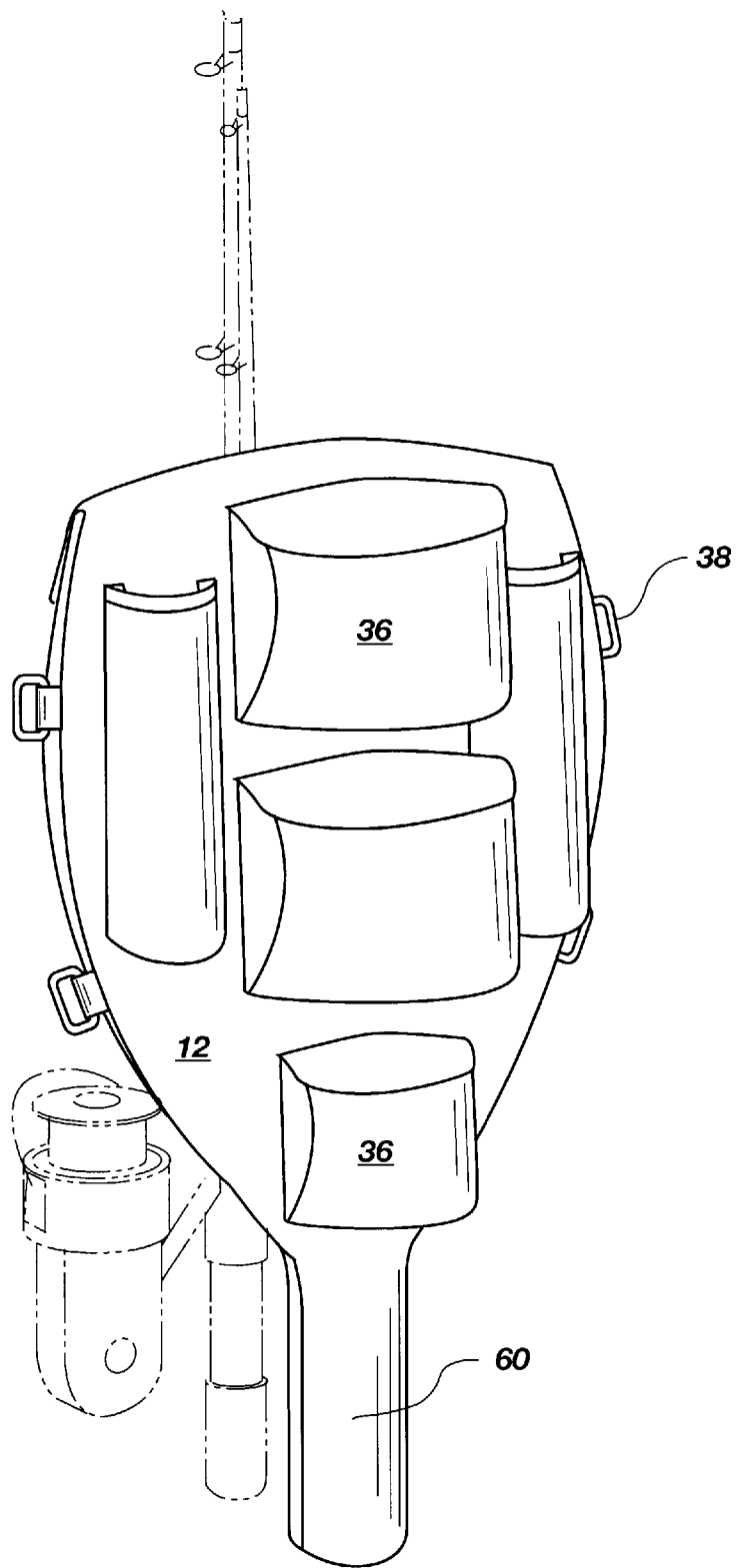
FIG. 6 is a perspective view of the fish landing net carrier having an enclosed pocket for retaining the landing net handle therein.

FIG. 6 illustrates an embodiment of the fish landing net carrier of the present invention having an enclosed pocket 60 for retaining the handle therein. The handle pocket 60 is formed by extending the respective front and back sides 12, 14, and attaching the adjacent perimeters together to form a single enclosure comprising the front side with its extension and the back side with its extension. In this manner, the fishing net handle can be better protected during transportation. In addition, the embodiment of FIG. 6 precludes the possibility of the fish net portion of the fish landing net working itself downwardly and out of the bottom opening 30 for the handle 20 shown in the previous embodiment, and therefore, precludes the possibility that the fish landing net mesh net portion would catch or hang on extraneous items.

Use of the fish landing net carrier of the present invention should be obvious from the foregoing disclosure. Specifically, the mesh net portion of the fish landing net is either wrapped around the rim 22, or otherwise collected in the center area of the rim, so that the fish landing net can be inserted, handle first, into the carrier. With the fish landing net totally enclosed in the carrier, the appropriate closure mechanism will contain the fish landing net therein and prevent the mesh net portion from catching on or otherwise becoming entangled on extraneous objects as the fisherman goes to and from his fishing site. With the fish landing net secured within the carrier, the fisherman also fills the various pockets 36 with necessary fishing accessories, and can carry the fully loaded fish landing net carrier, along with his tackle box containing other fishing accessories, the fish landing net carrier being carried by the handle, strapped over the fisherman's back, or attached to his backpack. Obviously, once at a fishing site, the fish landing net can be left inside its carrier until needed to assist in landing a hooked fish.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

PARTS LIST 10 fish landing net carrier
12 carrier front side
14 carrier back side
16 carrier side adjoining edge
18 carrier side adjoining edge
20 fish landing net
22 fish landing net rim
24 fish landing net mesh net portion
26 fish landing net handle
28 top opening
30 bottom (handle) opening
32 closure flap
34 loop end fastener
36 pockets
38 rings
40 fishing pole attachment strap
44 fishing pole attachment strap buckle
46 clear window pocket
48 pull string closure mechanism
50 top zipper
52 top side zipper
54 handle
56 shoulder straps
58 hooks
60 handle pocket
62 button closure
64 button holes
66 snap closure
68 mating snap

What is claimed is:

1. A carrier in combination with a fish landing net, the landing net comprising a rim, flexible net mesh attached to the rim, and a handle, the carrier sized and shaped to receive the fishing landing net therein, the carrier comprising:

two essentially flat and parallel sides of essentially identical size and shape permanently connected together at a portion of adjoining edges to define an openable enclosure pocket for receiving the landing net rim and net mesh therein;

closing means for closing the two sides together along at least a part of the adjoining edges that are not permanently connected together, for closing the carrier and retaining the landing net therein; and a handle opening between adjoining edges of the parallel sides for receiving the fishing landing net handle, the handle opening located opposite the closing means.

2. A carrier as set forth in claim 1, wherein at least one of the two sides further comprises a plurality of individual openable and closeable pockets thereon.

3. A carrier as set forth in claim 1, further comprising a fishing pole attaching means for attaching one or more fishing poles to the carrier.

4. A carrier as set forth in claim 1, further comprising carrying means for manually carrying and transporting the carrier.

5. A carrier as set forth in claim 4, wherein the carrying means comprises a handle.

6. A carrier as set forth in claim 4, wherein the carrying means comprises two straps oriented on the carrier to enable the carrier to be carried as a backpack.

7. A carrier as set forth in claim 4, wherein the carrying means comprises a strap.

8. A carrier as set forth in claim 1, wherein the closing means comprises a zipper connecting adjoining edges of the parallel sides along edges opposite the handle means.

9. A carrier as set forth in claim 1, wherein the closing means comprises a loop end fastener connecting adjoining edges of the parallel sides along edges opposite the handle opening.

10. A carrier as set forth in claim 1, wherein the closing means comprises a zipper in one of the parallel sides extending from adjoining edges of the sides opposite the handle means.

11. A carrier as set forth in claim 1, wherein one of the carrier parallel sides includes a flap adjacent the closing means, and the closing means comprises a button mechanism connecting the flap to the opposite carrier parallel side.

12. A carrier as set forth in claim 1, wherein one of the carrier parallel sides includes a flap adjacent the closing means, and the closing means comprises a snap mechanism connecting the flap to the opposite carrier parallel side.

13. A carrier in combination with a fish landing net, the landing net comprising a rim, flexible net mesh attached to the rim, and a handle, the carrier sized and shaped to receive the fishing landing net therein, the carrier comprising:

two essentially flat and parallel sides of essentially identical size and shape permanently connected together at a portion of adjoining edges to define an openable enclosure pocket for receiving the landing net rim and net mesh therein;

a handle opening between adjoining edges of the parallel sides for receiving the fishing landing net handle;

closing means for closing the two sides together along at least a part of the adjoining edges that are not permanently connected together, for closing the carrier and retaining the landing net therein; and structure attachment means for attaching the carrier to a separate structure.

14. A carrier for a fishing landing net, the landing net comprising a rim, flexible net mesh attached to the rim, and a handle, the carrier sized and shaped to receive the fishing landing net therein, the carrier comprising:

two essentially flat and parallel sides of essentially identical size and shape permanently connected together at a portion of adjoining edges to define an openable enclosure pocket for receiving the landing net rim and net mesh therein;

a handle opening between adjoining edges of the parallel sides for receiving the fishing landing net handle; and a draw string mechanism connecting adjoining edges of the parallel sides along edges opposite the handle opening for closing the two sides together along at least a part of the adjoining edges that are not permanently connected together.

* * * * *